United States Patent [19]
Chennakeshu et al.

[11] Patent Number: 6,035,178
[45] Date of Patent: Mar. 7, 2000

[54] SATELLITE COMMUNICATION SYSTEM FOR LOCAL-AREA COVERAGE

[75] Inventors: Sandeep Chennakeshu; Nils Rydbeck; Amer Hassan; Stanley L. Reinhold, all of Cary; David R. Irvin, Raleigh, all of N.C.

[73] Assignee: Ericsson Inc., Research Triangle Park, N.C.

[21] Appl. No.: 08/647,188

[22] Filed: May 9, 1996

[51] Int. Cl.⁷ .................................................. H04B 7/185
[52] U.S. Cl. ........................ 455/12.1; 455/427; 455/408; 455/422; 455/428
[58] Field of Search ................................. 455/12.1, 408, 455/13.1, 422, 426, 427, 428, 429, 554, 555, 407, 435, 462; 370/208; 379/112

[56] References Cited

U.S. PATENT DOCUMENTS

| | | | |
|---|---|---|---|
| 4,506,383 | 3/1985 | McGann | 455/17 |
| 4,616,108 | 10/1986 | Yamaguchi et al. | 455/12.1 |
| 4,860,341 | 8/1989 | D'Avello et al. | 455/409 |
| 4,901,307 | 2/1990 | Gilhousen et al. | |
| 4,956,875 | 9/1990 | Bernard et al. | 455/13.1 |
| 5,081,703 | 1/1992 | Lee | 455/13.1 |
| 5,278,891 | 1/1994 | Bhagat et al. | 455/13.1 |
| 5,394,560 | 2/1995 | Kane | 455/12.1 |
| 5,446,756 | 8/1995 | Mallinckrodt | |
| 5,448,623 | 9/1995 | Wiedeman et al. | 455/12.1 |
| 5,455,823 | 10/1995 | Noreen et al. | |
| 5,490,284 | 2/1996 | Itoh et al. | 455/13.1 |
| 5,574,970 | 11/1996 | Linquist et al. | 455/13.1 |
| 5,740,214 | 4/1998 | Rebec et al. | 455/3.2 |
| 5,748,610 | 5/1998 | Bustamante et al. | 370/208 |

FOREIGN PATENT DOCUMENTS

| | | |
|---|---|---|
| 536 921 | 4/1993 | European Pat. Off. . |
| WO92/00636 | 1/1992 | WIPO . |
| WO95/01012 | 1/1995 | WIPO . |

OTHER PUBLICATIONS

*Satellite Communications: Principles and Applications,* by david Calcutt and Laurie Tetley. Chapters 8 and 9 (1994).
Inter–Tel and Qualcomm Sign Development Agreement for CDMA Wireless Local Loop Products, PR Newswire Association, Inc., Financial News Section, Mar. 1, 1996.

*Primary Examiner*—Wellington Chin
*Assistant Examiner*—Yemane Woldetatios
*Attorney, Agent, or Firm*—Burns, Doane, Swecker & Mathis, L.L.P.

[57] ABSTRACT

A communication system provides efficient satellite communication in rural, remote, or sparsely populated areas, or in areas lacking a conventional telephone infrastructure, or in special purpose uses such as airport coverage. Subscribers in such areas communicate with the satellite via a simple, highly modular entry node located in a local area to be served. Subscriber units provide subscribers with access to the system. The subscriber units are connected to the entry node via local access loops provided by point-to-point wireless links between the subscriber units and the entry node. The entry node internally switches local traffic among subscribers and connects traffic to outside circuits, via wireless links with the satellite, as appropriate. The outside circuits are provided by the cooperative working of the satellite, an entry-node controller, and an earth station. The wireless links between the satellite and the entry node and the local access loops may operate at the same or different frequencies. If they operate at different frequencies, a frequency translator in the entry node controller matches the different frequencies. A subscriber unit may be used to provide the subscribers with access to the system such that speech compression and decompression takes place in the subscriber unit itself to avoid the effects of tandem coder/decoders.

17 Claims, 7 Drawing Sheets

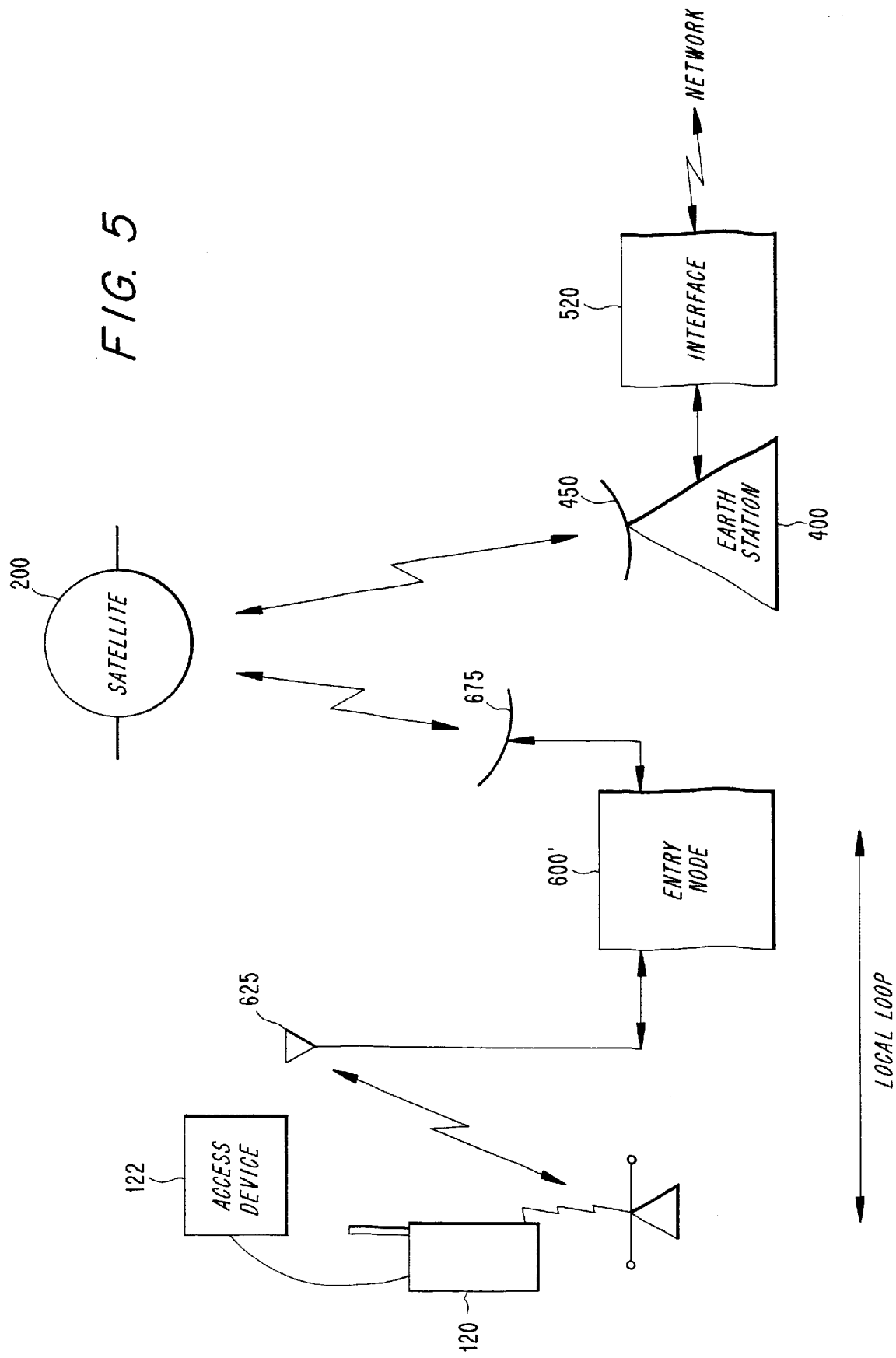

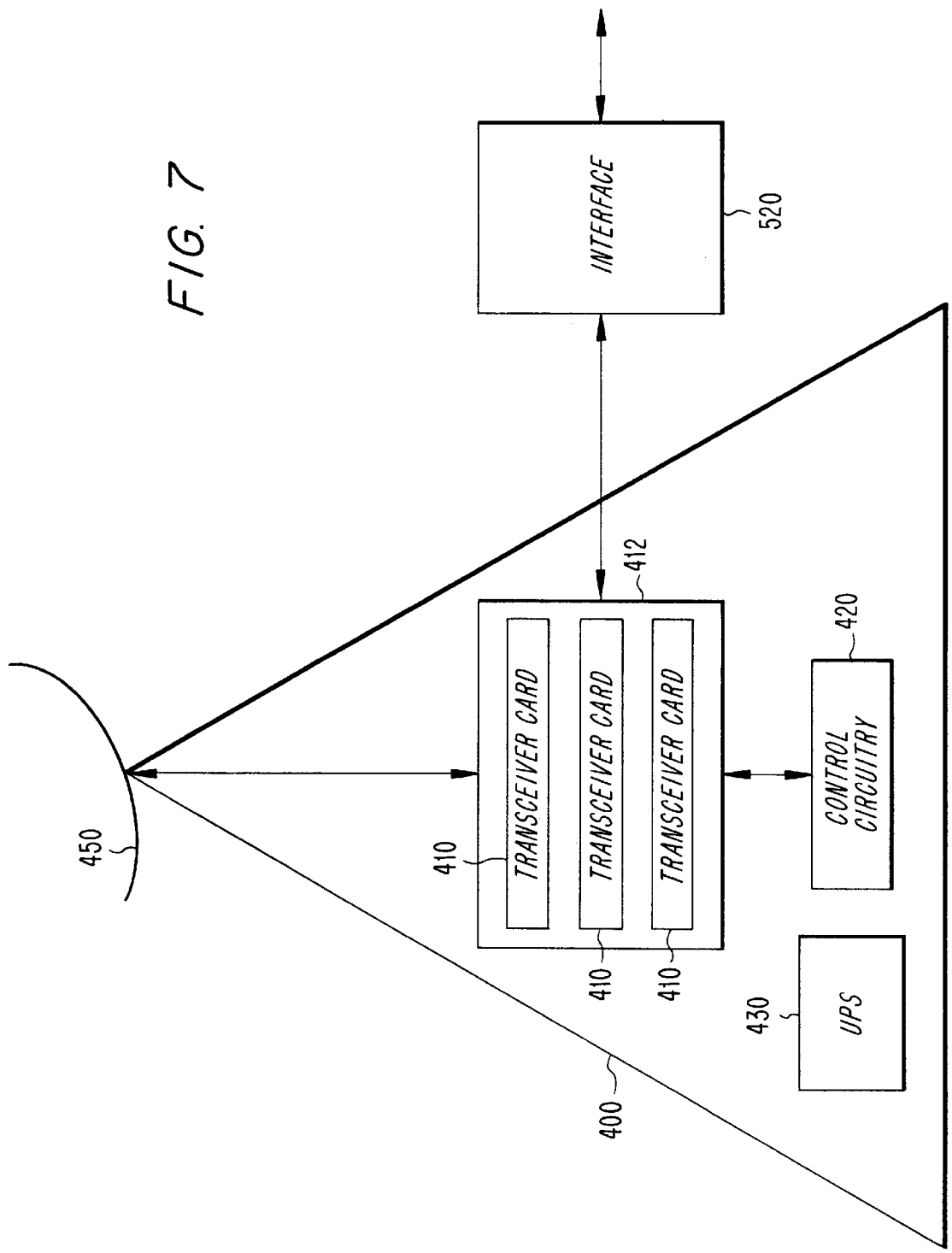

SATELLITE COMMUNICATION SYSTEM FOR LOCAL-AREA COVERAGE

BACKGROUND

This invention relates to a system for voice and data communication, and more particularly to a system for satellite communication in rural, remote, or sparsely populated areas, in areas lacking a conventional telephone infrastructure, and in areas such as airports and convention centers that are frequented by international travelers. These areas can be called generally "local areas".

Modern telephone networks have evolved mainly to address the need for service in densely populated, highly developed metropolitan areas. Thus, in many less developed countries where there is no concentrated need for service, no communication infrastructure exists to support telephone service. In developed countries, telephone service is typically provided under a governmental mandate that requires universal service for metropolitan and rural subscribers. Because today's telephone networks are optimized for densely populated areas, the mandated universal telephone service is inherently uneconomic when used in rural, remote, or sparsely populated areas. Several attempts have been made to solve these problems.

One possible solution is the use of microwave links to extend the reach of conventional telephone technology employed in metropolitan areas to rural, remote, or sparsely populated areas. This approach is inadequate for less developed countries that have no communication infrastructures to support the microwave links. Even for a country that has a communication infrastructure, maintenance is prohibitively expensive with this approach because the equipment required to extend the existing telephone technology to rural areas is remotely located, sometimes in unpopulated areas, and therefore is exposed to vandalism and natural hazards. The maintenance expense is further increased by the long travel-times needed for service personnel to reach the remotely, possibly inconveniently, located equipment. Moreover, the small subscriber pool in a rural area makes it uneconomic to extend a wireline network to such an area.

Another possible solution is the use of high-power land-mobile-radio transmitters, such as those used for police, fire, and other emergency services, to provide local area coverage. The general lack of a well developed communication infrastructure for connecting a land-mobile-radio system to the public switched telephone network (PSTN) is a serious drawback of this solution. Further, to provide sufficient geographic coverage, many transmitter sites would have to be deployed.

A third possible solution is the use of a cellular radio system. Like wireline telephone networks, however, cellular systems have evolved to address the needs of highly developed, densely populated areas. Thus, as with wireline networks, less developed countries lack the communication infrastructures for supporting cellular service. In developed countries, the cell sizes in cellular systems have steadily decreased in order to maximize economic efficiency in high-use, densely populated urban environments. In contrast, the adaptation of cellular radio systems for rural, remote, or sparsely populated areas would require large cells; thus, cellular radio systems have generally been recognized as less attractive alternatives to satellite communication systems if the latter are available.

A variant of the cellular radio solution is a multi-line terminal that permits multiple subscribers to gain access to a cellular system using conventional wireline telephones. This approach is explained in detail in U.S. patent application Ser. No. 08/505,665 to Henry et al., entitled "Analog Fax and Modem Requests in a D-AMPS Multi-Line Terminal System", filed on Jul. 21, 1995, which is expressly incorporated here by reference. While this approach does not require subscribers to replace their analog wireline phones with digital cellular phones, it does not remove the inefficiencies noted above in applying cellular radio technology to rural areas.

FIG. 1A illustrates another possible solution that employs a satellite communication system. In FIG. 1A, one of a plurality of subscriber units 100 communicates with a satellite system 200 via an antenna 150. The satellite system 200 comprises at least a single geostationary satellite or a plurality of non-geostationary satellites. The satellite system 200 may operate, for example, in the manner of today's Inmarsat or in the manner proposed for the Iridium, Odyssey, or ACES systems. The satellite system 200 also communicates with an earth station 400 via an antenna 450. The earth station 400 transmits traffic from the satellite to a public network, such as a PSTN, or from the network to the satellite via a gateway switch 500.

Various aspects of conventional earth stations and satellite systems are described in the literature, including David Calcutt and Laurie Tetley, *Satellite Communications: Principles and Applications*, chapters 8 and 9 (1994); and U.S. Pat. Nos. 4,901,307 to Gilhousen et al.; U.S. Pat. No. 5,446,756 to Mallinckrodt; and U.S. Pat. No. 5,455,823 to Noreen et al. Information is transmitted according to various modulation and access schemes, including amplitude, frequency, and phase modulations, and frequency division, time division, and code division multiple access.

A significant disadvantage of the conventional satellite approach is that it imposes a high demand on the transmission capacity of the satellite transponders because the subscribers' local traffic and signaling are routed through the satellite. "Local traffic" is traffic between subscriber units 100. Consequently, this approach is primarily used to supplement existing wireline or cellular systems, rather than to provide the basic communication infrastructure. In practice, this approach is typically limited to supporting roughly 1,000-to-20,000 subscribers per satellite, simultaneously, in contrast to a conventional central office switch or a private branch exchange (PBX) that can simultaneously support in excess of 100,000 subscribers.

Other disadvantages of the conventional satellite approach arise from the constraints under which satellite systems operate. These constraints include the limited electrical power available aboard a satellite and the limited radio bandwidth used for interference-free communication with the earth station. Of course it will be appreciated that even some terrestrially based radio signal repeaters suffer the same constraints, which can arise from an inaccessible and remote location of the repeater.

FIG. 1B illustrates a variant of the conventional satellite communication system depicted in FIG. 1A. In this variant, PBXs 510, 520 are used with wideband, high-capacity satellite earth stations 410, 420, respectively. In such a system, PBXs 510, 520 internally switch local traffic between the subscriber units 100 to which they are connected and rely on the satellite system 200 for trunking between them. This variant suffers from the disadvantage of requiring either expensive, complex earth stations 410, 420 or complex and expensive subscriber units 100 for communicating with the satellites. Also, such systems are typically optimized for densely populated environments, particularly large commercial office parks or large private corporate networks. Because wideband, high-capacity earth stations are required, the cost and the attention required of an operator make this approach unattractive for use in rural, remote, or sparsely populated areas or for special-purpose applications such as airport coverage.

The communication system described in the patent to Gilhousen et al. cited above is an example of this variant. The patent describes a system having one or more satellite or terrestrial repeater stations and one or more central stations that communicate information among mobile or fixed, local or remote users. The satellite repeater stations can communicate directly with the users or indirectly through a central station and the terrestrial repeaters to the users. The system preferentially uses the satellite repeaters to interconnect users, especially rural users, although as users come within range of terrestrial repeaters, those users can be linked through the terrestrial repeaters. The patent also mentions that the users can be linked directly.

Thus, there is a need for a communication system that can efficiently provide service to subscribers in urban environments with poor telecommunication infrastructure, in rural, remote, or sparsely populated areas, and in special areas, such as airports and other transportation hubs. Such a communication system would ideally be adaptable to a wide variety of circumstances and population densities, thereby enabling it to serve efficiently both rural and urban needs.

SUMMARY

According to this invention, a system is provided for efficient communication in rural, remote, or sparsely populated areas, in areas lacking a conventional telephone infrastructure, and in special areas such as airports where traffic is relatively localized. Subscribers in such areas communicate with a satellite system via a simple, highly modular entry node located in the area to be served.

In one aspect of the invention, the system comprises a plurality of subscriber units for providing the subscribers with access to the system; an entry node for communicating with the subscriber units via respective local access loops; a satellite system for communicating with the entry node via a respective radio frequency link; an earth station for communicating with the satellite system via a respective radio frequency link; and an interface for connecting the earth station to a remote communication network, such as a PSTN. The entry node provides a communication channel through which a first subscriber unit can communicate with a second subscriber unit, and the entry node provides a communication channel through which a third subscriber unit can communicate with the remote communication network. The entry node internally switches local traffic between subscribers and connects traffic to outside circuits via wireless links with the satellite system, as appropriate. The outside circuits are connected to the subscriber units through the cooperative operation of the satellite system, the entry-node controller in the entry node, and the earth station.

In one aspect of the invention, the entry node comprises a plurality of transceivers for exchanging communication signals with the subscriber units via the respective local access loops; means for switching communication signals among the subscriber units and the remote communication network; and an entry node controller for exchanging communication signals with the satellite system and for controlling the switching means.

In other aspects of the invention, the entry-node controller and the earth station each comprise control circuitry and a plurality of single-channel wireless transceivers for communicating with the satellite system. The single-channel wireless transceivers provide individual circuits via wireless links through the satellite system. Each such link connects a first wireless transceiver at the entry node, a wireless channel through a transponder in the satellite system, a second wireless transceiver at the earth station, and a remote network circuit connected through the communication interface.

In yet other aspects of the invention, the entry-node controller translates frequencies used in the local access loops, which may be wire-line or wireless, to frequencies used in the wireless links to the satellite system, and vice versa, and decodes and responds to call-signaling data.

In another aspect of the invention, a subscriber unit that provides access to the system is connected to the entry node via a local access loop. The satellite signal is frequency-translated as required and sent to the subscriber unit where the traffic is decoded. Traffic is converted from the satellite mode to the subscriber mode, and vice versa, within the subscriber unit, rather than within the entry node, thereby avoiding possible detrimental effects due to tandem speech coder/decoders (codecs). Either the entire baseband signal or only compressed speech data may be sent to the subscriber unit for processing, any remaining processing having been done at the entry node.

BRIEF DESCRIPTION OF THE DRAWINGS

These and other objects and advantages of the invention will be understood by reading this description in conjunction with the drawings, in which:

FIG. 5 illustrates another communication system according to the invention;

FIG. 7 illustrates an earth station that may be employed in the communication systems depicted in FIGS. 2 and 5.

DETAILED DESCRIPTION

Figure 2:
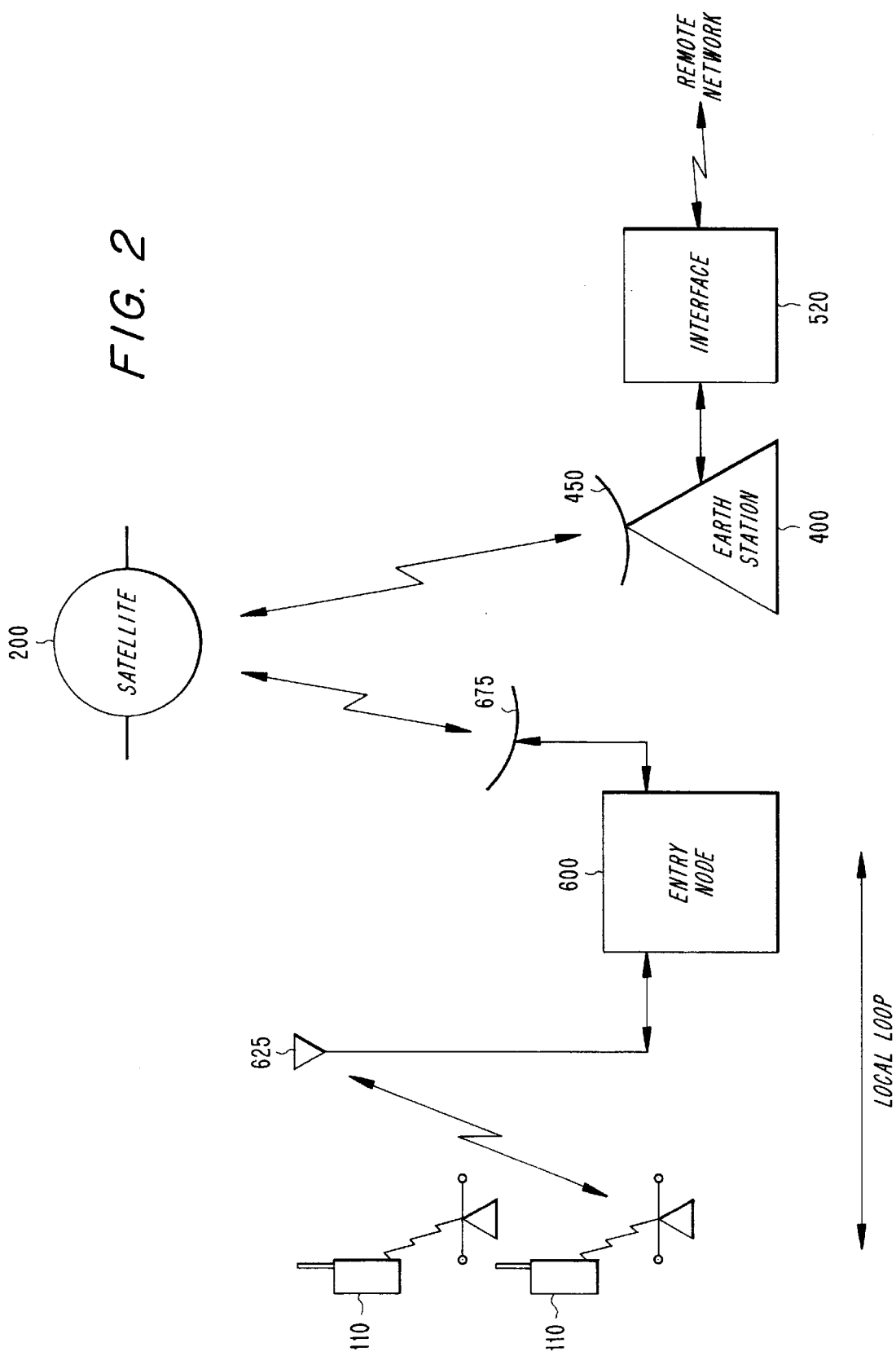
FIG. 2 illustrates a communication system according to the invention.

FIG. 2 illustrates a communication system in accordance with the invention. Subscriber units 110 provide subscribers with access to the communication system, and each unit 110 may comprise, for example, a conventional cordless telephone. The subscriber units 110 are connected to a simple, highly modular entry node 600 by respective local access loops, which are illustrated in FIG. 2 as wireless radio links between the subscriber units 110 and an antenna 625 for the entry node 600. The local access loops may operate, for example, according to the Digital European Cordless Telecommunications (DECT) standard, the Global System for Mobile Communication (GSM) standard, or other known or compatible standards for wireless communications, such as the standards used for specialized private mobile radio applications. Although FIG. 2 illustrates the local access loops as wireless radio loops, it will be appreciated that the local access loops may include terrestrial optical fiber, coaxial cable, or copper wire loops. In addition, it will be appreciated that the subscriber units 110 may include conventional wireline and other telephones.

Traffic from the subscriber units 110 is carried to and from the satellite system 200 by the entry node 600, which is located in a local area to be served by the system. The entry node 600 internally switches local traffic among the subscribers and connects traffic between the subscribers in the local area and outside circuits through the satellite system as appropriate. The entry node 600 communicates with the satellite system 200 via a suitable antenna 675, and the satellite system communicates with an earth station 400 via an antenna 450. A communication interface 520 connects the earth station 400 to a remote network, such as a PSTN, a public land mobile network (PLMN), a public switched data network (PSDN), or other remote network, and thus facilitates communication between the subscribers in the local area of the entry node 600 and the outside circuits of the remote network. Communication between the terrestrial and orbital portions of the communication system can advantageously be carried out in accordance with the systems and methods described in U.S. patent application Ser. No. 08/179,953 filed on Jan. 11, 1994, by Paul W. Dent for "Cellular/Satellite Communications System with Improved Frequency Re-Use", which is incorporated here by reference.

An important advantage of the communication system illustrated in FIG. 2 is that switching of the local subscriber traffic is performed by the entry node 600, rather than the satellite system 200, thereby conserving the communication capacity of the satellite system. With such efficient utilization of capacity, the satellite system 200 can be shared with other applications. It will be appreciated that the satellite system 200 is representative of a wide variety of signal repeaters that suffer from limitations of electrical power and signal bandwidth. Thus, although this description is given in terms of earth-orbiting satellites, it should be interpreted as relating to terrestrially based signal repeaters as well.

Figure 1A:
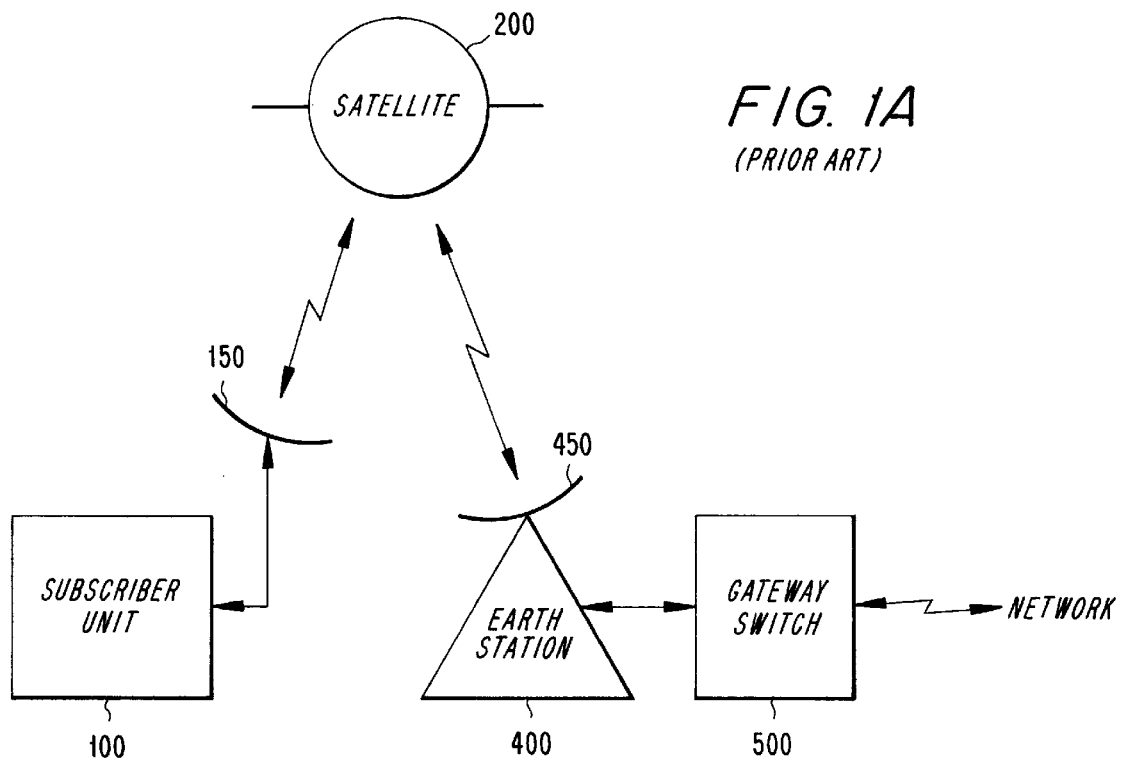
FIGS. 1A, 1B illustrate conventional satellite communication systems.
Figure 3:
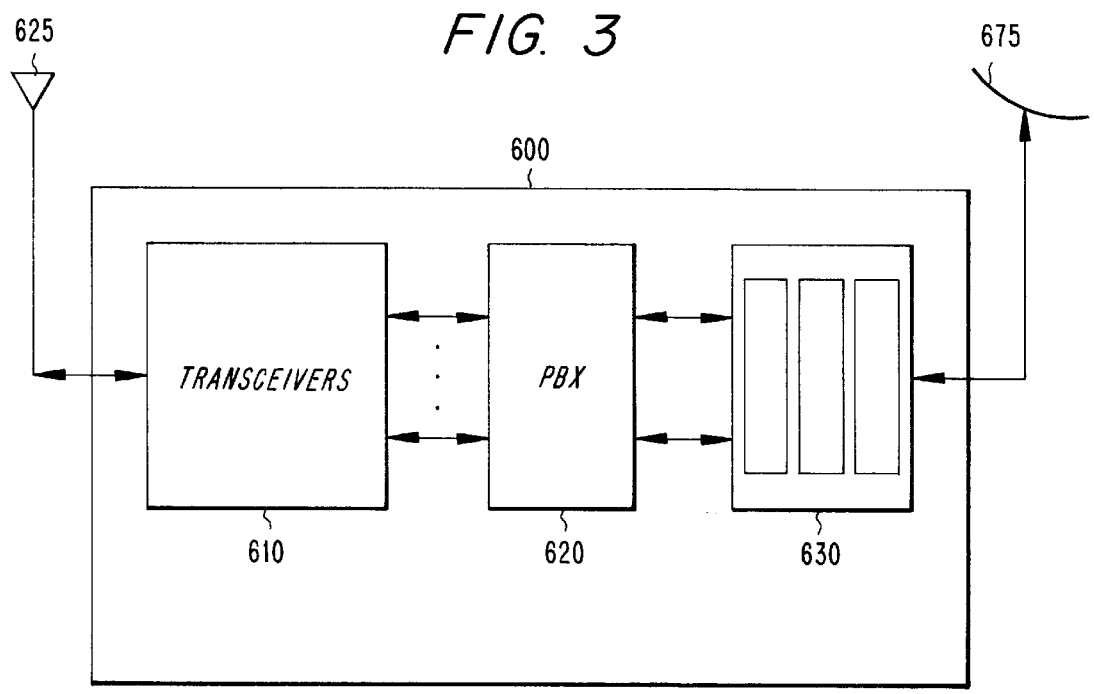
FIG. 3 illustrates an entry node that may be employed in the communication system depicted in FIG. 2.
Figure 1B:
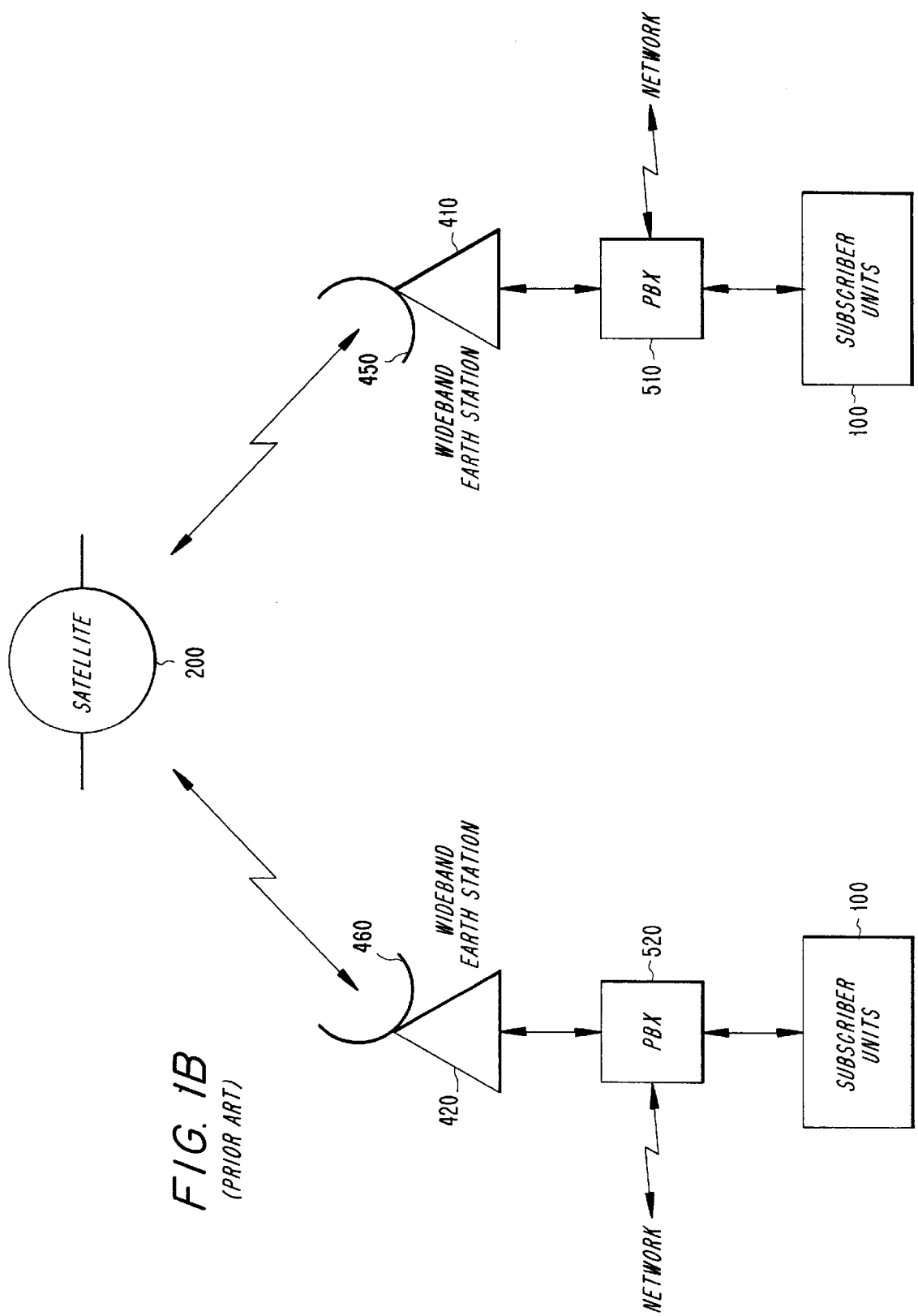

FIG. 3 is a block diagram of an entry node 600 employed in the communication system depicted in FIG. 2. The entry node 600 comprises a plurality of transceivers 610 for providing point-to-point wireless links for the local access loops, or other suitable means for interfacing the entry node to subscriber units connected to the entry node by optical fiber, coaxial cable, or copper wire local access loops. The transceivers 610 and/or interfacing means provide communication signals to and from the subscriber units to a PBX 620, which switches that traffic between the transceivers 610 and an entry-node controller 630. The entry-node controller 630 controls the transmission and reception through antenna 675 of traffic between the satellite system 200 and the entry node 600.

Figure 4A:
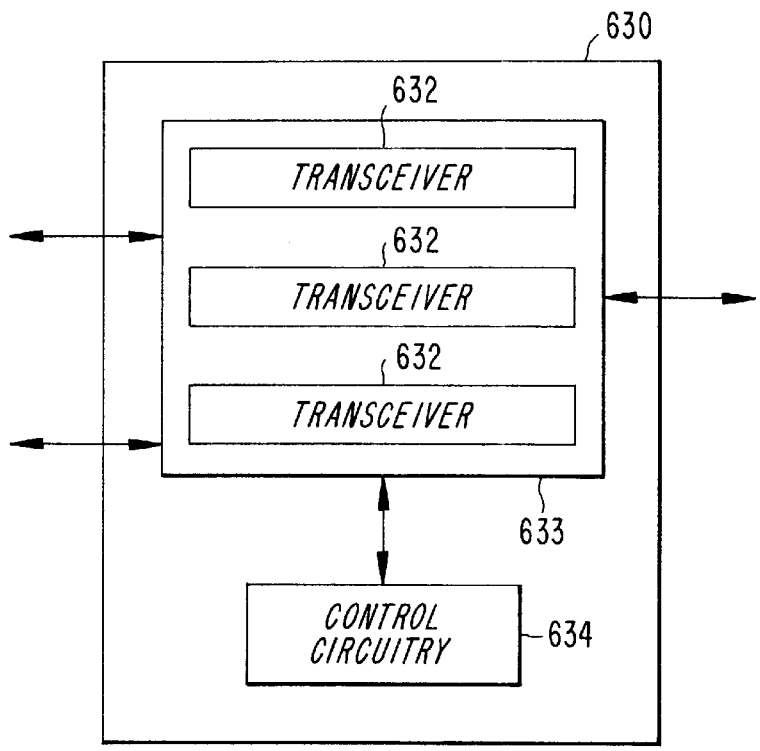
FIGS. 4A, 4B illustrate different embodiments of entry-node controllers according to the invention.

FIG. 4A is a block diagram of one embodiment of an entry-node controller 630 in accordance with the invention. As shown in FIG. 4A, the entry-node controller comprises a plurality of single-channel transceivers 632, each of which may be an electronic circuit card of the type usually found in hand-held radio telephones designed for direct-access satellite communications. The transceiver cards 632 may be conveniently disposed in a suitable casing 633, and the cards operate under the control of a control circuit 634, which selects the appropriate available transceiver for transmitting and receiving traffic. The functionality of a suitable transceiver is generally described in the Noreen et al. patent cited above. The control circuit 634 manages the transceiver cards 632 and controls any signaling or signal format conversions that may be needed for establishing and terminating calls from and to the PBX 620 through the satellite system 200.

The control circuit 634 also controls operations of the transceivers 610 in establishing and terminating calls from and to the subscriber units 110. Thus, the functions performed by the control circuit 634 are similar to the functions of the control unit described in U.S. patent application Ser. No. 08/505,665, which was cited and incorporated by reference above.

Each single-channel transceiver 632 provides an individual circuit through the satellite system 200 via a suitable wireless link to the satellite. Each such circuit comprises a single-channel transceiver 632 at the entry node 600, a wireless channel through a transponder in the communication satellite system 200, a second wireless transceiver at the earth station 400, and the remote network connected through the communication interface 520. A circuit may, for example, be configured to carry a traditional full-duplex, 64 kilobits/sec, pulse code modulation (PCM) telephone conversation between a subscriber unit 110 connected to the entry node 600 and the remote network. In this example, the 64 Kbits/sec data stream from the subscriber unit would be compressed into a 4 Kbits/sec data stream for transmission to the satellite, and the 4 Kbits/sec data stream from the satellite would be decompressed into a 64 Kbits/sec data stream for transmission to the subscriber unit. Compression/decompression would be carried out by voice coder/decoders (vocoders, or speech codecs) in the single-channel transceiver 632 assigned to the communication circuit by the control circuit 634 and in a transceiver 410 in the earth station 400.

Figure 4B:
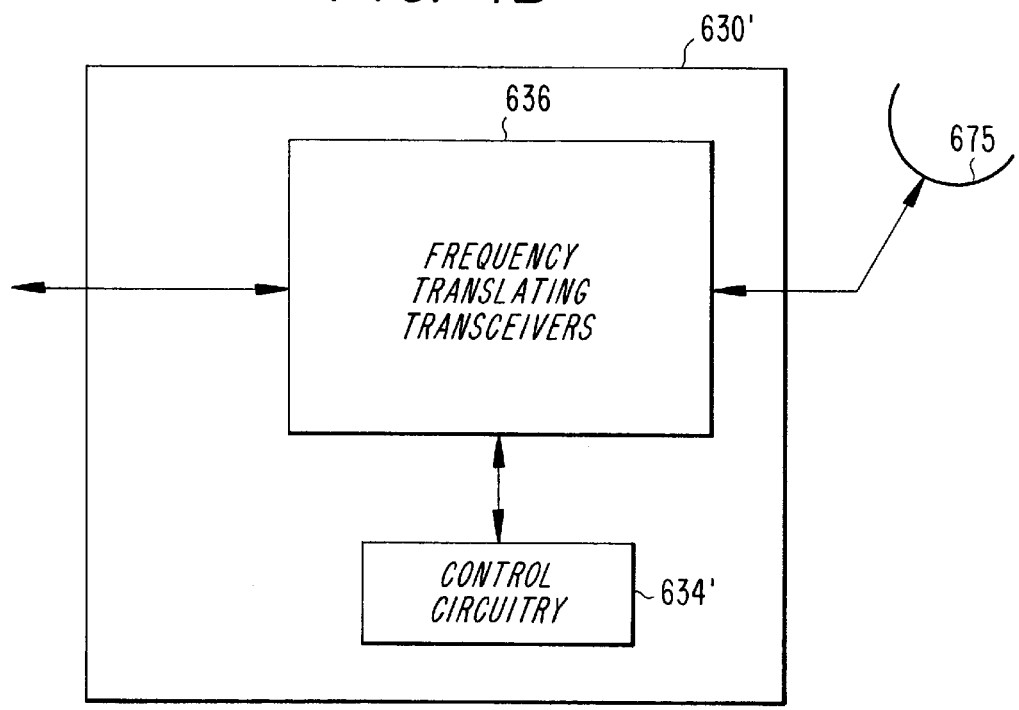

FIG. 4B is a block diagram of another entry-node controller 630' in accordance with the invention. The entry-node controller 630' comprises a control circuit 634' and a transceiver and frequency translator 636 for converting the frequency of signals exchanged in the local access loop to the frequency of signals exchanged through the antenna 675 in the wireless link to the satellite system 200. (FIG. 4B shows only one transceiver/translator 636, but it will be understood that a plurality of such devices would typically be provided.) The translator 636 can match the frequencies by mixing an incoming signal down to baseband or to an intermediate frequency and then upconverting to a frequency suitable for the outgoing signal. Ideally, the communication standard by which the wireless link to the satellite operates is compatible with the communication standard used by PBX 620 and the local access loop so that the control circuit 634' and the transceiver and frequency translator 636 can be simply constructed. The control circuit 634' also provides any decoding functionality needed for proper response to control signals transmitted with data messages between the earth station and the subscribers, in order to execute supervisory functions during calls. The control signals may be carried by a control channel that is transmitted either separately, in place of, or multiplexed together with the data messages.

FIG. 5 illustrates a communication system in accordance with another aspect of the invention, in which an isolated subscriber unit 120 is employed. The unit 120 may comprise, for example, a wireless base station such as that used in a conventional PLMN. A local access loop between the wireless base station 120 and an entry node 600' is advantageously a point-to-point wireless link or a conventional wire loop. Access to the wireless base station 120 may be controlled by a device 122, which may accept coins or other currency, credit cards, debit cards, or the like, so that a user can access the wireless base station and place calls without having an individual subscription to the communication system. The subscriber unit 120 may advantageously be located in a public place, such as an airport or other transportation terminal. It will be understood that the communication protocols used for a system that accepts currency may differ from the protocols used for a system that accepts credit cards in that a protocol is needed for the communications related to the creditor's authorization of the use of the credit card. Such authorization is not necessary when currency is used.

As in the system illustrated in FIG. 2, the entry node 600' is connected to the subscriber unit 120 by a wireless link through an antenna 625 and to the satellite system 200 by a wireless link through an antenna 675. The satellite system communicates with an earth station 400 via an antenna 450, and a communication interface 520 connects the earth station 400 to a remote network, such as a PSTN, PLMN, PSDN, or other remote network.

Figure 6:
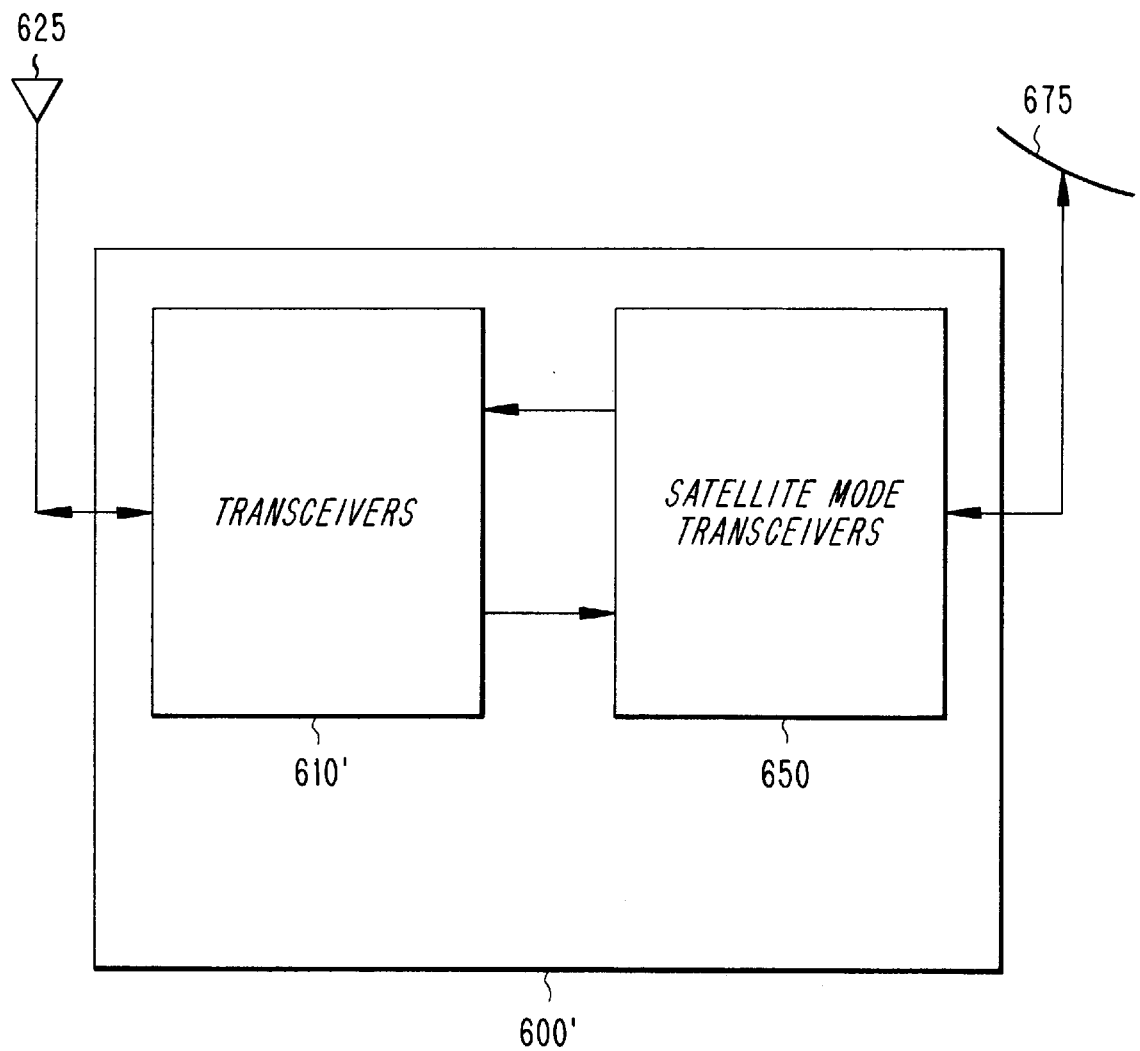
FIG. 6 illustrates an entry node that may be employed in the communication system depicted in FIG. 5.

FIG. 6 is a block diagram of the entry node 600' that may be employed in the communication system depicted in FIG. 5. The entry node 600' comprises a plurality of transceivers 610' and a plurality of satellite mode transceivers 650. In contrast to the systems illustrated in FIGS. 2, 3, 4A, and 4B in which signals from the satellite are processed and converted from the satellite mode (e.g., 4 Kbit/sec) to the subscriber mode (e.g., 64 Kbit/sec) in the entry node by vocoders in the single-channel transceivers 632, the transceivers 610' do not include vocoders. In this embodiment, the vocoders reside in the subscriber unit 120, and signals are not converted until they arrive at the subscriber unit 120. Thus, for example, a suitable signal processing circuit in the subscriber unit 120 controls the decompression and compression of traffic sent to and from the subscriber unit 120, as well as the decoding and encoding of speech data. This reduces the amount of conversion required in the system and thus maintains a high quality signal by avoiding degradation that would otherwise be introduced by the operation of tandem speech codecs. Some of the problems caused by tandem speech codecs are described in U.S. patent application Ser. No. 08/498,410 filed on Jul. 5, 1995, by J. Lantto for "Call Forwarding in a Mobile Communication System". This also reduces the amount of circuit hardware required in the entry node.

FIG. 7 illustrates an earth station 400 that may be employed in the communication systems shown in FIGS. 2 and 5. The earth station 400 comprises control circuitry 420 and a plurality of single-channel transceivers 410 for communicating with the satellite system 200 via the antenna 450. In addition, the earth station 400 advantageously comprises an uninterruptible power supply 430. For reasons that are apparent from the functions carried out by the earth station, the earth station may be called a "gateway".

As with the transceivers 632 shown in FIG. 4A, the transceivers 410 may be conveniently disposed in a casing 412. The control circuitry 420 controls the switching of traffic to and from the transceivers 410 and the communication interface 520. It will be appreciated that, since the communication interface is connected to the earth station, the communication interface 520 and the control circuitry 420 may be a unified subsystem or they may be separate but co-located. The communication interface handles signal conditioning and protocols for transmission over the PSTN, PLMN, PSDN, or other remote network to which it is connected via additional gateways as necessary.

It will be understood that the invention is not limited to the particular embodiments that are described above. This description contemplates any and all modifications that fall within the essence of the invention as defined by the following claims.

What is claimed is:

1. A system for communicating between subscribers and a remote network, comprising:
    a plurality of subscriber units for providing the subscribers with access to the system;
    an entry node for communicating with the subscriber units via respective local access loops, the entry node comprising a plurality of transceivers for exchanging communication signals with the subscriber units via the respective local access loops; without requiring exchanging of communication signals via a satellite;
    a satellite system for communicating with the entry node via a respective radio frequency link;
    an earth station for communicating with the satellite system via a respective radio frequency link; and
    an interface for connecting the earth station to a remote communication network;
    wherein the entry node provides a communication channel through which a first subscriber unit can communicate with a second subscriber unit, and the entry node provides a communication channel through which a third subscriber unit can communicate with the remote communication network.

2. The system of claim 1, wherein the local access loops are wire-line loops.

3. The system of claim 1, wherein the local access loops are wireless loops.

4. The system of claim 1, wherein the entry node comprises:
    means for switching communication signals among the subscriber units and the remote communication network; and
    an entry node controller for exchanging communication signals with the satellite system and for controlling the switching means.

5. The system of claim 4, wherein the entry node controller comprises:
    a plurality of single channel transceivers for transmitting and receiving communication signals from the satellite system; and
    a control circuit for controlling the single channel transceivers and the switching means.

6. The system of claim 4, wherein the communication signals exchanged via the respective local access loops have a first frequency and signals carried by the radio frequency links have a second frequency.

7. The system of claim 6, wherein the entry node controller comprises:
    a plurality of single channel transceivers for transmitting and receiving communication signals from the satellite system;
    a control circuit for controlling the single channel transceivers; and
    means for converting communication signals having the first frequency to signals having the second frequency, whereby signals having the first frequency are transmitted to the subscriber units and signals having the second frequency are transmitted to the satellite system.

8. The system of claim 1, wherein the local access loops operate according to a publicly agreed standard for wireless communication, and the radio frequency links operate according to a standard compatible with the publicly agreed standard for wireless communication.

9. A system for exchanging communication signals among subscribers and a remote network, comprising:

a subscriber unit for providing the subscribers with access to the system;

an entry node connected to the subscriber unit via a local access loop, the entry node comprising a plurality of transceivers for transmitting and receiving communication signals to and from the subscriber unit; without requiring exchange of communication signals via satellite;

a satellite system connected to the entry node via a respective radio frequency link;

an earth station connected to the satellite system via a respective radio frequency link; and an interface for connecting the earth station to the remote network;

wherein the entry node switches connections and between the subscriber units and the remote network.

10. The system of claim 9, wherein the local access loop is a wire-line loop.

11. The system of claim 9, wherein the local access loop is a wireless loop.

12. The system of claim 9, wherein the subscriber unit compresses communication signals transmitted to the satellite system and decompresses communication signals received from the satellite system.

13. The system of claim 9, wherein the entry node comprises:

a plurality of satellite mode transceivers for transmitting and receiving communication signals from the satellite system.

14. The system of claim 9, wherein the local access loop operates according to a publicly agreed standard for wireless communication, and the radio frequency link operates according to a standard compatible with the publicly agreed standard for wireless communication.

15. A system for exchanging communication signals among subscribers and a remote network, comprising:

a subscriber unit for providing a subscriber with access to the system, an entry node connected to the subscriber unit via a local access loop for exchanging communication signals with the subscriber unit without requiring exchange of the communication signals via satellite;

a satellite system connected to the entry node via a respective RF link, an earth station connected to the satellite system via a respective RF link, and an interface connected to the earth station and to the remote network, wherein the entry node relays a communication signal digitally encoded for satellite transmission to the subscriber unit for decoding.

16. The system of claim 15, wherein the system is activated on receipt of payment.

17. The system of claim 16, wherein payment is made by one of government currency, credit card, and debit card.

* * * * *